3,681,144
LITHIUM-METAL SELENIDE ORGANIC
ELECTROLYTE CELL
Arabinda Narayan Dey, Needham, and Per Bro, Andover, Mass., assignors to P. R. Mallory & Co., Inc., Indianapolis, Ind.
Filed Sept. 3, 1970, Ser. No. 69,272
Int. Cl. H01m 23/02
U.S. Cl. 136—83 R          15 Claims

ABSTRACT OF THE DISCLOSURE

This invention relates to novel primary electric cells (with extremely flat discharge curves) comprising positive electrodes composed of metal selenides wherein the metals are selected from the group consisting of silver, copper, iron, cobalt, nickel, mercury, thallium, lead, bismuth and the mixtures thereof; and the negative electrodes composed of light metals, said electrodes being disposed in an electrolyte comprising an organic solvent selected from the group consisting of tetrahydrofuran, N-nitrosodimethylamine, dimethyl sulfite, propylene carbonate, gamma-butyrolacetone, dimethyl carbonate, dimethoxyethane, acetonitrile, dimethyl sulfoxide, dimethyl formamide, and mixtures thereof, and having dissolved therein soluble salts of the metals, for example, the perchlorates, hexafluorophosphates, tetrafluoroborates, tetrachloroaluminates, hexafluoroarsenates of lithium.

---

We have discovered that a new class of inorganic compounds (which, to our knowledge, have never been used as depolarizers in the batteries) can be used as depolarizers in the organic electrolyte batteries. These materials are metal selenides, e.g., selenides of copper, iron, bismuth, lead, silver, cobalt, nickel, mercury, thallium, and the mixtures thereof. The compounds were never used as depolarizers in the conventional acidic and alkaline batteries because of their instability and low voltage characteristics in those electrolytes. These deficiencies were overcome, in this invention, by using organic electrolytes and lithium anodes. The materials were found to be stable in the organic electrolytes and exhibit desirable voltage characteristics with the lithium anode.

The object of the invention is to provide a series of novel lithium-metal selenide organic electrolyte cell with:

(a) high volumetric and gravimetric energy density,
(b) high material utilization efficiency,
(c) long shelf life,
(d) exceptionally steady output voltage throughout the life of the cell,
(e) no spontaneous gassing during the storage and the operation of the cell.

The cathode fabrication, the lithium anode fabrication, the electrolyte and the cell construction are similar to that described in the invention of copending application U.S. Ser. No. 55,170, filed July 15, 1970.

The performance of the various lithium-metal selenide cells, constructed as above, is described below:

(1) Lithium-copper selenide cell: The open circuit voltage of the cell was 3.29 volts. The cell was discharged using a constant current of 4.5 ma. (1 ma./cm.$^2$) which corresponded to a 25 hour rate. The initial steady voltage on load was 1.5 volts. The "practical" open circuit voltage was 2.3 volts. The operating cell potential remained at 1.5±0.1 volts throughout the major portion (80%) of the cell life. The material utilization was found to be 88% up to the 1.1 volt end point. The cathode reaction was assumed to be:

$$CuSe + 2Li + 2e \rightarrow Cu + Li_2Se$$

Figure 1:
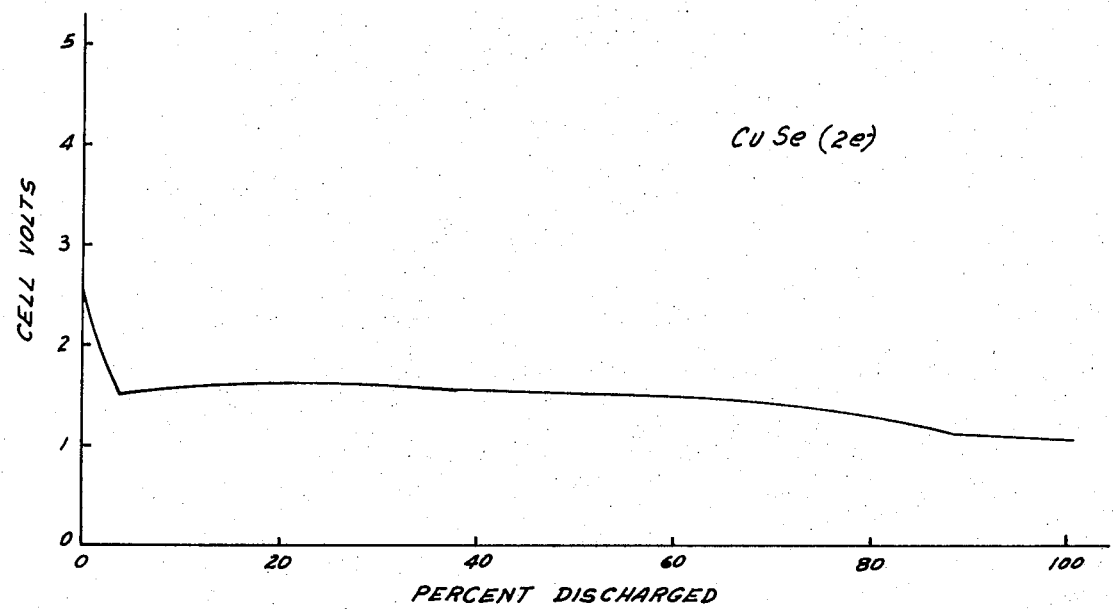

The discharge curve is shown in FIG. 1.

(2) Lithium-ferric selenide cell: The open circuit voltage of this cell was found to be 3.3 volts. The discharge conditions of this cell were similar to that in the example (1).

The initial steady output voltage was 1.35 and it did not change during the useful discharge of the cell, 80% of stoichiometric capacity. The practical open circuit voltage was found to be 1.6 volts. The material utilization up to the 1.0 volt end point was found to be 80% based on the following cathode discharge reaction:

$$FeSe_2 + 2Li^+ + 2e \rightarrow FeSe + Li_2Se$$

Figure 2:
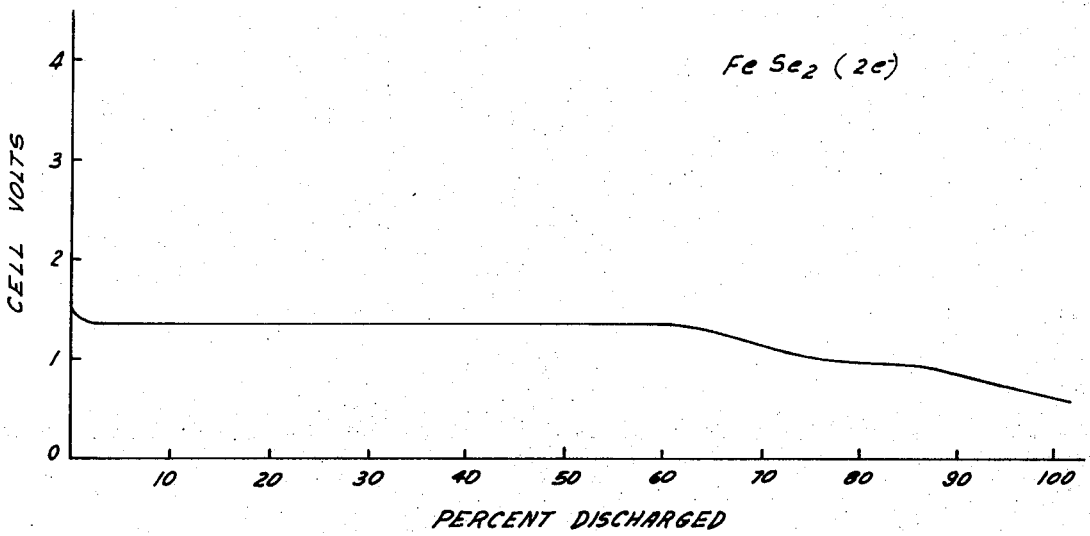

The discharge curve is shown in FIG. 2. The exceedingly high voltage stability (1%) is the special feature of this system.

The theoretical energy densities of this system were calculated to be 327 w.-hr./lb. and 35 w.-hr./in.$^3$, based on the open circuit voltage of 1.6 volts.

The other Li-metal selenide cells tested, in addition to Li/CuSe and Li/FeSe$_2$, were: Li-nickel selenide, Li-mercury selenide, Li-lead selenide and Li-bismuth selenide. The discharge characteristics of all these systems are shown in Table 1. The discharge curves of these cells are shown in FIGS. 3 through 6 in the same order as shown above.

It is apparent that all these systems are characterized with the exceedingly steady output voltages, heretofore, unattainable in most of the existing systems. The systems, in general, are also characterized with high volumetric capacity and the complete absence of gassing.

The invention is applicable to all the metal-selenides which exhibit some degree of electronic conductivity. In addition to this, the scope of this invention is similar to the scope of the invention disclosed in copending application U.S. Ser. No. 55,170, filed July 15, 1970.

THE SCOPE OF THE INVENTION

This invention is applicable to all primary cells with:

(1) light metal anodes, e.g., Li, Na, Al, Mg, Ca, K, and Be.
(2) organic solvents such as tetrahydrofuran, N-nitrosodimethylamine, dimethyl sulfite, propylene carbonate, dimethyl sulfoxide, dimethyl formamide, gamma-butyrolactone, dimethyl carbonate, methyl formate, butylformate, acetonitrile, dimethoxyethane, and the mixtures thereof.
(3) electrolytes comprising the above solvents and all soluble salts of Li, Na, K, Mg, Ca, Al, and Be dissolved therein. The perchlorates, hexafluorophosphates, tetrafluoroborates, tetrachloroaluminates, and hexafluoroarsenates are particularly suitable.

TABLE 1.—PERFORMANCE OF Li-METAL SELENIDE CELLS
4.5 ma. constant current, 1 ma./cm.$^2$ C.D. 20–30 hr. rate

Figure 3:
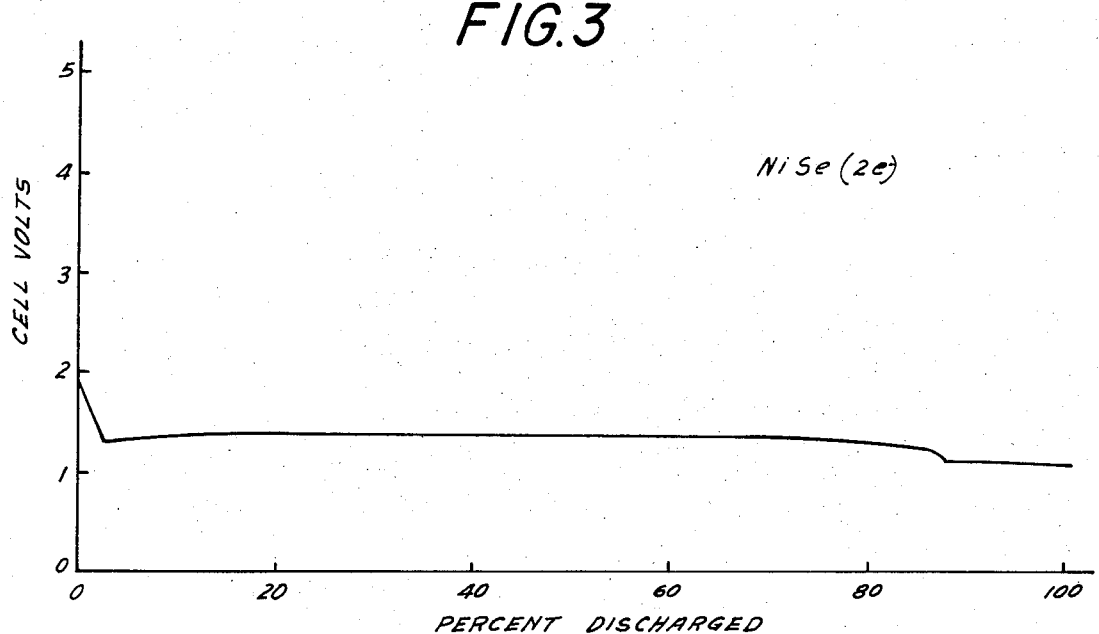
Figure 4:
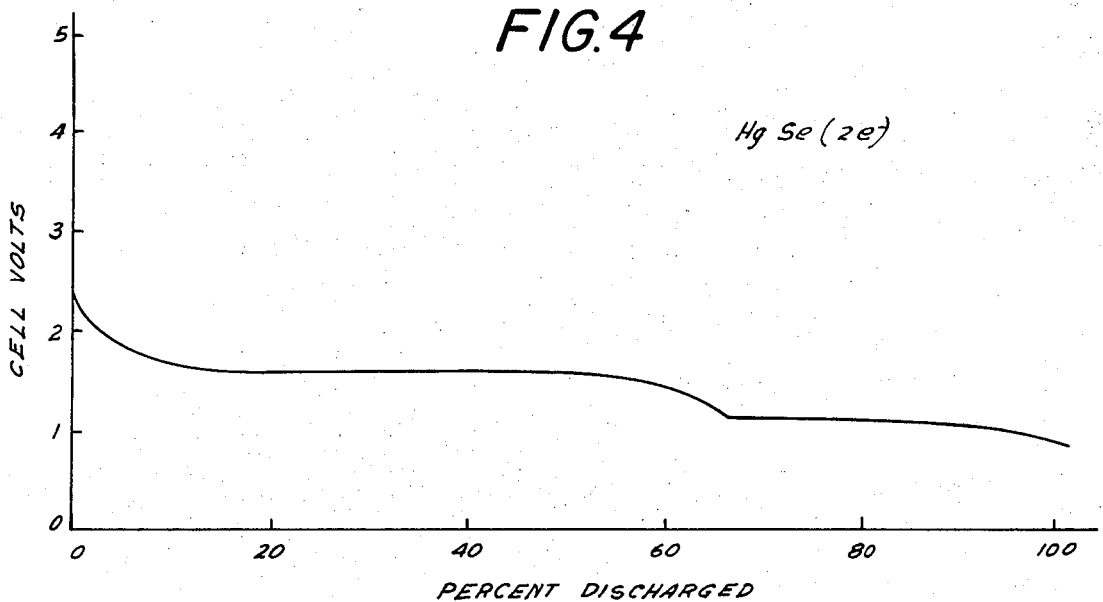
Figure 5:
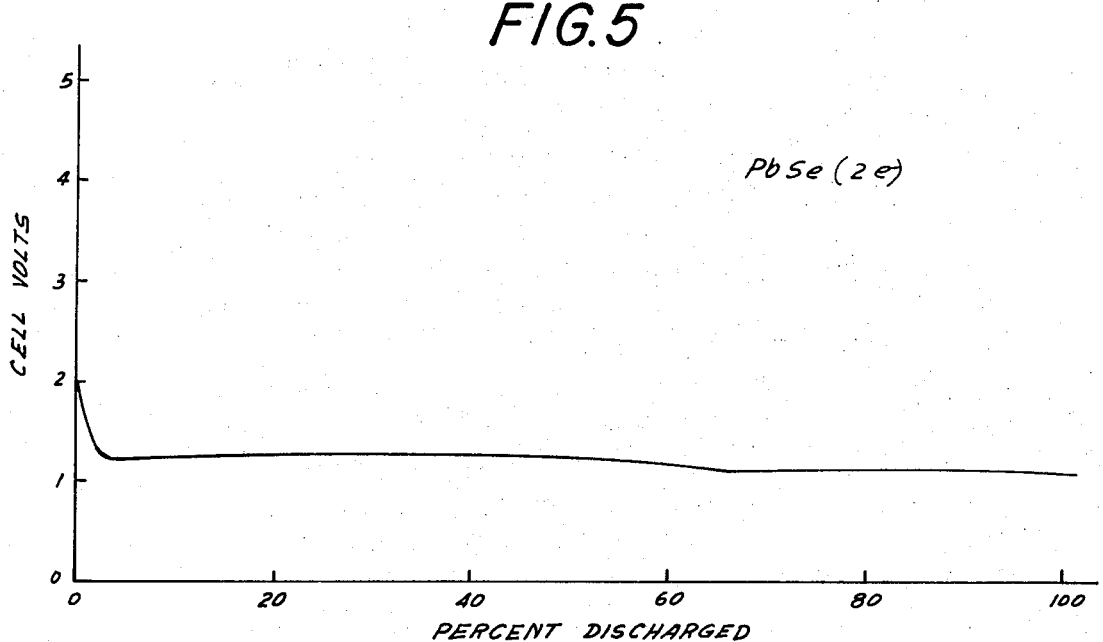
Figure 6:
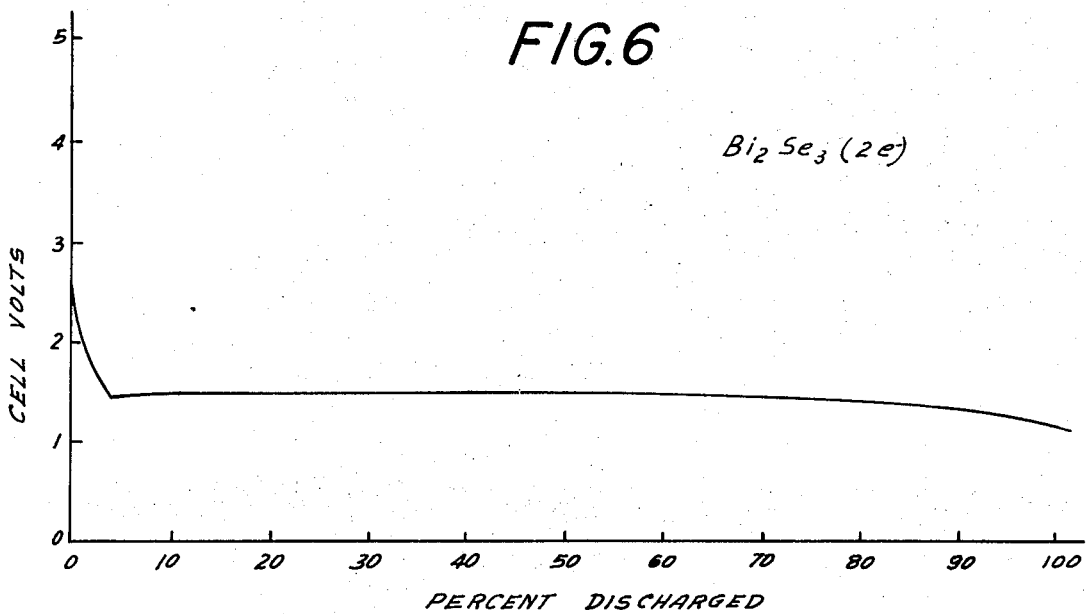

| Cell | Initial O.C.V. | "Practical" O.C.V. | Average operating voltage | Material utilization efficiency, percent | Assumed cathode reaction | Discharge curve |
|---|---|---|---|---|---|---|
| Lithium/copper selenide | 3.29 | 1.8 | 1.5±0.10 | 88 | $CuSe + 2Li^+ + 2e \rightarrow Cu + Li_2Se$ | Figure 1. |
| Lithium/iron selenide | 3.30 | 1.6 | 1.35±0.05 | 80 | $FeSe_2 + 2Li^+ + 2e \rightarrow FeSe + Li_2Se$ | Figure 2. |
| Lithium/nickel selenide | 3.00 | 1.7 | 1.40±0.10 | 88 | $NiSe + 2Li^+ + 2e \rightarrow Ni + Li_2Se$ | Figure 3. |
| Lithium/mercury selenide | 3.26 | 1.9 | 1.60±0.20 | 65 | $HgSe + 2Li^+ + 2e \rightarrow Hg + Li_2Se$ | Figure 4. |
| Lithium/lead selenide | 2.78 | 1.5 | 1.20±0.10 | 100 | $PbSe + 2Li^+ + 2e \rightarrow Pb + Li_2Se$ | Figure 5. |
| Lithium/bismuth selenide | 3.20 | 1.8 | 1.45±0.05 | 100 | $Bi_2Se_3 + 6Li^+ + 6e \rightarrow Bi + 3Li_2Se$ | Figure 6. |

What is claimed is:

1. A high energy density primary cell comprising a positive electrode composed of the selenides of silver, copper, iron, cobalt, nickel, mercury, thallium, lead and bismuth and their mixtures; a negative electrode composed of a light metal, said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxyethane, acetonitrile, dimethyl sulfoxide, dimethyl formamide, and mixtures thereof, and having dissolved therein soluble salts of the light metals.

2. The cell in claim 1 wherein the electrolyte is composed of a solution of lithium perchlorate in tetrahydrofuran and the negative electrode is composed of lithium.

3. The cell in claim 2 wherein the positive electrode is composed of a mixture of silver selenide and a conductive diluent.

4. The cell in claim 2 wherein the positive electrode is composed of a mixture of copper selenide and a conductive diluent.

5. The cell in claim 2 wherein the positive electrode is composed of a mixture of iron selenide and a conductive diluent.

6. The cell in claim 2 wherein the positive electrode is composed of a mixture of cobalt selenide and a conductive diluent.

7. The cell in claim 2 wherein the positive electrode is composed of a mixture of nickel selenide and a conductive diluent.

8. The cell in claim 2 wherein the positive electrode is composed of a mixture of mercury selenide and a conductive diluent.

9. The cell in claim 2 wherein the positive electrode is composed of a mixture of thallium selenide and a conductive diluent.

10. The cell in claim 2 wherein the positive electrode is composed of a mixture of lead selenide and a conductive diluent.

11. The cell in claim 2 wherein the positive electrode is composed of a mixture of bismuth selenide and a conductive diluent.

12. The cell in claim 1 in which the light metal is selected from the group consisting of Li, Na, K, Ca, Be, Mg and Al.

13. The cell in claim 1 in which the soluble salt is selected from the group consisting of the perchlorates, hexafluorophosphates, tetrafluoroborates, tetrachloroaluminates, and hexafluorophosphates of the light metals.

14. The cell in claim 1 in which the soluble salt is selected from the group consisting of the perchlorates, hexafluorophosphates, tetrafluoroborates, tetrachloroaluminates and hexafluorophosphates of Li.

15. The cell in claim 2 wherein the conductive diluent is graphite.

References Cited

UNITED STATES PATENTS

| | | | |
|---|---|---|---|
| 2,081,926 | 6/1937 | Gyuris | 136—83 R |
| 3,468,716 | 9/1969 | Eisenberg | 136—100 |
| 3,508,966 | 4/1970 | Eisenberg | 136—6 |
| 3,562,017 | 2/1971 | Lyall | 136—137 |
| 3,578,500 | 5/1971 | Maricle et al. | 136—6 |

ANTHONY SKAPARS, Primary Examiner

U.S. Cl. X.R.

136—137, 154